US 9,429,088 B2

(12) United States Patent
Schmitt et al.

(10) Patent No.: US 9,429,088 B2
(45) Date of Patent: Aug. 30, 2016

(54) LEAN NOX TRAP DESULFATION PROCESS

(71) Applicant: DELPHI INTERNATIONAL OPERATIONS LUXEMBOURG S.A.R.L., Bascharage (LU)

(72) Inventors: Julien Schmitt, Kuntzig (FR); Eric L. P. Michel, Guelff (BE)

(73) Assignee: Delphi International Operations Luxembourg S A.R.L., Luxembourg (LU)

( * ) Notice: Subject to any disclaimer, the term of this patent is extended or adjusted under 35 U.S.C. 154(b) by 58 days.

(21) Appl. No.: 14/390,407

(22) PCT Filed: Mar. 6, 2013

(86) PCT No.: PCT/EP2013/054458
§ 371 (c)(1),
(2) Date: Oct. 3, 2014

(87) PCT Pub. No.: WO2013/149782
PCT Pub. Date: Oct. 10, 2013

(65) Prior Publication Data
US 2015/0135681 A1 May 21, 2015

(30) Foreign Application Priority Data
Apr. 5, 2012 (EP) .................................... 12163298

(51) Int. Cl.
F01N 3/18 (2006.01)
F02D 41/02 (2006.01)
(Continued)

(52) U.S. Cl.
CPC ......... F02D 41/0235 (2013.01); F01N 3/0814 (2013.01); F01N 3/0885 (2013.01);
(Continued)

(58) Field of Classification Search
CPC ............. F02D 41/028; F02D 41/0002; F02D 41/405; F01N 3/0871; F01N 3/0885; F01N 2430/06; F01N 2610/03; F01N 2900/1612
See application file for complete search history.

(56) References Cited

U.S. PATENT DOCUMENTS 6,199,373 B1  3/2001  Hepburn et al.
6,691,507 B1  2/2004  Meyer et al.
(Continued)

FOREIGN PATENT DOCUMENTS

EP  2 031 217 A1  3/2009
EP  2 177 739 A1  4/2010
(Continued)

OTHER PUBLICATIONS

International Search Report dated Jun. 19, 2013.

Primary Examiner — Jonathan Matthias
(74) Attorney, Agent, or Firm — Joshua M. Haines

(57) ABSTRACT

A process for desulfation of a NOx adsorber in a diesel internal combustion engine exhaust system is disclosed, which comprises: determining an amount of post fuel ($Q_2$) required to reach a relatively rich target exhaust air fuel ratio ($AFR_{rich}$) on the basis of a measured air flow; determining a heating-contributing fuel value ($\eta Q_2$) required to reach or maintain a target desulfation temperature in said NOx adsorber by way of an exothermal reaction; calculating a target air flow ($Air_{tgt}$) corresponding to the air flow required for a substantially stoichiometric combustion of a torque-contributing main fuel quantity ($Q_1$) together with said heating-contributing fuel value ($\eta Q_2$); and causing the engine to inject said post fuel amount ($Q_2$) and said main fuel quantity ($Q_1$) while controlling the air flow to meet said target air flow ($Air_{tgt}$).

14 Claims, 3 Drawing Sheets

(51) Int. Cl.
- *F01N 3/08* (2006.01)
- *F02D 41/14* (2006.01)
- *F02D 41/18* (2006.01)
- *F02D 41/40* (2006.01)
- *F02D 41/00* (2006.01)
- *F01N 3/10* (2006.01)
- *F01N 13/00* (2010.01)
- *F01N 3/20* (2006.01)
- *F01N 11/00* (2006.01)

(52) U.S. Cl.
CPC .......... *F01N 3/106* (2013.01); *F01N 3/206* (2013.01); *F01N 11/00* (2013.01); *F01N 13/009* (2014.06); *F02D 41/0002* (2013.01); *F02D 41/0007* (2013.01); *F02D 41/0055* (2013.01); *F02D 41/025* (2013.01); *F02D 41/028* (2013.01); *F02D 41/1446* (2013.01); *F02D 41/18* (2013.01); *F02D 41/405* (2013.01); *F01N 2610/00* (2013.01); *F01N 2900/1404* (2013.01); *F02D 2200/70* (2013.01); *F02D 2250/18* (2013.01); *F02D 2250/32* (2013.01); *Y02T 10/144* (2013.01); *Y02T 10/24* (2013.01); *Y02T 10/26* (2013.01); *Y02T 10/42* (2013.01); *Y02T 10/44* (2013.01); *Y02T 10/47* (2013.01)

(56) References Cited

U.S. PATENT DOCUMENTS

| | | |
|---|---|---|
| 2005/0284131 A1 | 12/2005 | Forthmann et al. |
| 2006/0086085 A1* | 4/2006 | Wang .................. F01N 3/0885 60/295 |
| 2009/0019836 A1* | 1/2009 | Nagaoka .............. F01N 3/0253 60/285 |

FOREIGN PATENT DOCUMENTS

| | | |
|---|---|---|
| FR | 2 907 508 A1 | 4/2008 |
| WO | 2004/055346 A1 | 7/2004 |
| WO | 2006/017056 A1 | 2/2006 |

* cited by examiner

LEAN NOX TRAP DESULFATION PROCESS

CROSS REFERENCE TO RELATED APPLICATIONS

This application is a national stage application under 35 U.S.C. 371 of PCT Application No. PCT/EP2013/054458 having an international filing date of 6 Mar. 2013, which designated the United States, which PCT application claimed the benefit of European Patent Application No. 12163298.8 filed on 5 Apr. 2012, the entire disclosure of each of which are hereby incorporated herein by reference.

FIELD OF THE INVENTION

The present invention generally relates to NOx traps for internal combustion engines and more specifically to the desulfation procedure of such NOx traps.

BACKGROUND OF THE INVENTION

Various mechanisms have been developed for limiting nitrous oxide emissions from internal combustion engines.

As it is well known, nitrogen oxides (also known as NOx) are of particular concern in lean-burn, diesel engines, and devices such as NOx traps—also known as NOx adsorbers or Lean NOx Traps (LNT)—and Selective Catalytic Reduction (SCR) systems have been developed for this purpose.

A NOx trap assists in reducing NOx emissions by storing nitrogen dioxide as nitrates in zeolite adsorbers during fuel-lean conditions and releasing the nitrates as nitrogen oxides and oxygen during fuel-rich conditions, which are then converted into $N_2$ and $H_2O$. In diesel engines, a lean NOx trap conventionally combines the NOx adsorbing function with an oxidation catalyst function. Hence, the LNT generally consists of a single housing with adsorbing catalyst material and oxidation catalyst material (to provide the functions of a diesel oxidation catalytic converter). Alternative configurations include a NOx trap arranged downstream of a diesel oxidation catalytic converter (DOC).

NOx traps significantly reduce NOx emissions, but have a susceptibility to sulfur poisoning. Indeed, sulfur is present in fuel and engine oil and tends to bind to nitrate sites on the zeolite adsorber in the form of sulfates $SO_4$. Because sulfates are more stable than nitrates and carbonates, the sulfur species are not released during the fuel-rich regeneration process that is performed to release the carbon dioxide and nitrogen oxides, i.e. in the regular operating range for NOx adsorbers at 150 to 500° C.

Various processes have been developed to desulfurize NOx traps. One conventional approach is to control the engine so that the NOx trap temperature reaches an appropriate temperature of generally above 600° C. while running a rich air-fuel mixture, typically by post fuel injection. A difficulty here is however that the temperature of the NOx trap should not rise up to levels where it may damage the latter. Therefore, as for the regeneration mode, in desulfation mode the engine is operated so that the exhaust air fuel mixture is alternately lean and rich in order to limit the temperature.

U.S. Pat. No. 7,036,489 relates to a NOx trap desulfation process employing an on-board reformer producing hydrogen and carbon monoxide to control the operating air-fuel ratio at the NOx trap.

OBJECT OF THE INVENTION

The object of the present invention is to provide an improved desulfation process for a NOx adsorber.

This object is achieved by a process as claimed in claim 1.

SUMMARY OF THE INVENTION

In accordance with the present invention, a process for operating the desulfation (also desulfurization) of a NOx adsorber comprises an active phase including the following steps:

determining an amount of post fuel required to reach a relatively rich target exhaust air-fuel ratio on the basis of a measured air flow;

determining a heating-contributing fuel value required to reach or maintain a target desulfation temperature in the NOx adsorber by way of an exothermal reaction;

calculating a target air flow corresponding to the air flow required for a substantially stoichiometric combustion of a torque-contributing main fuel quantity together with said heating-contributing fuel value;

causing the engine to inject said post fuel amount and said main fuel quantity while controlling the air flow to meet said target air flow.

The present process provides a desulfation process for a NOx trap that does not require toggling between rich and lean air-fuel ratios to avoid overheating and is particularly well adapted for diesel engines. As a matter of fact, the present process provides a desulfation process where the NOx trap temperature can be stably maintained at a target temperature in a given desulfation temperature range, while the exhaust air-fuel ratio is maintained at a rich target value.

To reach these goals of constant target NOx trap temperature and constant air-fuel ratio, the present process relies mainly on two parameters: the air flow in the engine and the post fuel quantity. The post fuel quantity that is injected in the engine is calculated depending on the torque contributing fuel amount and the actual, measured air flow. Concurrently, the air flow into the engine cylinders is controlled to burn stoichiometrically a fuel quantity corresponding to the torque-contributing fuel and the fuel quantity contributing to the heating of the NOx trap, this latter fuel quantity being preferably determined on the basis of the actual temperature (measured) and the desired temperature. Once the torque-contributing and heating-contributing fuel amounts have been burnt, the remaining fuel, induced by the target, rich air fuel ratio, is carried in the oxygenless exhaust gases and can thus provide the rich air/fuel ratio required for desulfurization.

The NOx trap is normally part of an exhaust after treatment means that associates with the NOx trap an oxidation catalyst function that preferably has the same oxidation function as an oxidation catalytic converter, in particular, in the case of a diesel engine a diesel oxidation catalytic converter (DOC). The oxidation catalyst function is nowadays often combined in the same housing as the NOx adsorbing function, as is the case for the conventional "lean NOx trap" (LNT) used in diesel engines—also referred to as NOx accumulator-type catalytic converter. Alternatively, the oxidation catalyst function can be provided as a separate device, although this is considered obsolete.

It will however be understood that the heating of the NOx trap is obtained by the heating-contributing fuel amount reacting with the oxidation catalyst function, either present in the same housing as the NOx trap or in a separate device upstream of the NOx trap.

Preferably, the heating-contributing fuel value is determined with respect to the exotherm occurring in the oxidation catalyst function of the LNT. In this connection, the heating-contributing fuel value may be determined based on a steady state model of the LNT.

The process preferably uses enabling and disabling criteria which may comprise one or more of the following:
- the process is enabled when an estimator of the sulfur mass trapped in the NOx adsorber exceeds a predefined threshold or when the observed NOx efficiency is too low;
- the active phase is operated in a predetermined engine speed and load range, preferably 1 200 to 2 500 rpm and 20% to 50% of maximum engine torque;
- the active phase is disabled in case the temperature of the NOx adsorber exits a desulfation temperature range (e.g. 600 to 750° C.) and/or the engine load and/or speed exit(s) predetermined ranges;
- the process is disabled based on the status of a desulfation indicator.

These and other embodiments are recited in dependent claims 2-11.

According to another aspect, the present invention concerns an internal combustion engine exhaust system comprising a NOx adsorber and a controller configured to operate the above described process for desulfation of the NOx adsorber.

BRIEF DESCRIPTION OF THE DRAWINGS

The present invention will now be described, by way of example, with reference to the accompanying drawings, in which.

DETAILED DESCRIPTION OF A PREFERRED EMBODIMENT

Figure 1:
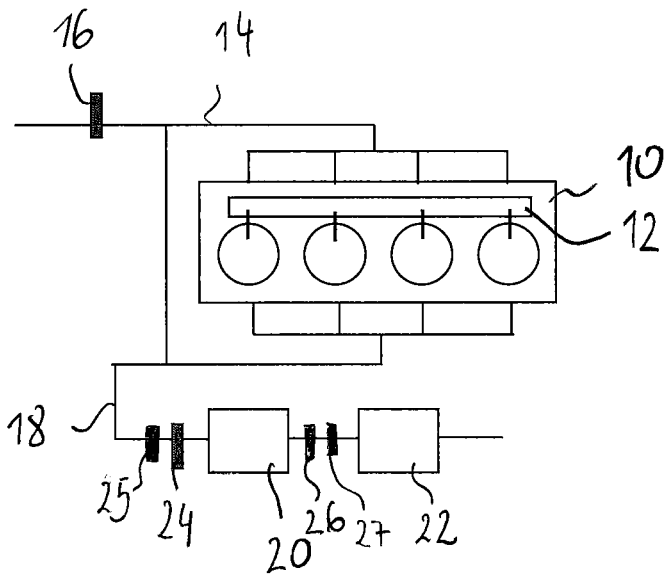
FIG. 1: is a principle diagram showing an exhaust after treatment means adapted to operate in accordance with the present process.

FIG. 1 is a principle diagram showing one variant of exhaust after treatment means adapted for operation in accordance with the present process and hence located downstream of an engine block of an internal combustion engine. The engine block 10 is represented with 4 cylinders and has an injection system 12 for diesel fuel. Reference sign 14 indicates the intake air piping with an air flow meter 16 measuring the air mass flowing there through. The exhaust system 18 comprises an exhaust piping including, in series, a lean NOx Trap (hereinafter LNT) 20 and a Diesel Particulate Filter 22. A temperature sensor 24 measures the temperature of the exhaust gases upstream the LNT 20. An oxygen (lambda) sensor 26 is located either at the outlet of the LNT 20 or at the outlet of the DPF in order to determine the need for nitrogen regeneration and, optionally, to provide a feedback for the air fuel ratio closed-loop control during desulfation. A temperature sensor 27 measures the temperature of the exhaust gases coming out of the LNT 20.

As it is known, in diesel engines the NOx adsorbing function of the LNT is generally associated with a diesel oxidation function, as in the LNT 20 of FIG. 1. The term lean NOx trap generally designates such devices where oxidation catalytic material (similar to that of a DOC) is combined with NOx storage catalyst material (e.g. zeolites such as barium oxides), in a common housing; such LNT is also known as NOx accumulator-type catalytic converter. Structurally, the LNT may be built like a DOC, i.e. it may comprise a ceramic substrate structure supporting a "washcoat" of oxide mixture and catalytically active precious metal(s), e.g. Pt, Pd and/or Rh, in which the NOx storage catalytic material is also supported.

Alternatively, the NOx adsorbing and oxidation functions can be arranged in separate housings, where the DOC is then arranged upstream of the NOx adsorber.

Classically, the LNT will store NOx while the engine is operated with an excess of air (lean burn), which is typical for diesel engines. LNT regeneration may be detected by the sensor 26, and a regeneration mode is then entered, involving toggling between lean and rich exhaust at normal temperatures. A further requirement is the periodic desulfation of the LNT.

Figure 2:
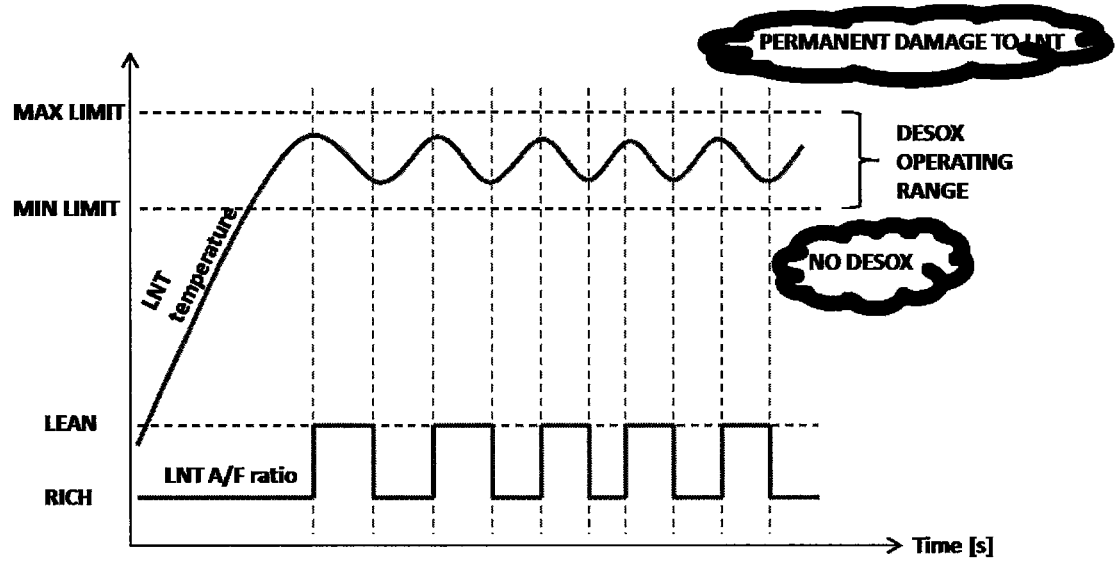
FIG. 2: is a graph illustrating a conventional desulfation process.

FIG. 2 illustrates the conventional desulfation procedure of a LNT, by which the engine is operated to achieve a high temperature in the NOx Trap and rich conditions, for example lambda=0.95 and 650° C. This procedure, customarily involving toggling between lean and rich modes, is performed to maintain the LNT temperature in the desulfation temperature range.

The reason for the toggling is that the catalyst temperature is often controlled by post fuel injection, whereby fuel is burnt in the catalyst to provide an exothermic reaction, similarly to the regeneration of a Diesel Particulate Filter.

However, to achieve a fast desulfurization (i.e. of short duration), it is desirable to maintain the rich conditions together with a substantially stable (permanent) high temperature of the catalyst. This is the purpose of the present process.

Accordingly, the present process concerns a process of desulfation ("deSOx") of a NOx adsorber having an associated oxidation catalyst function, wherein the desulfation process comprises performing a post fuel injection to adjust the temperature by an exothermic reaction.

It shall be appreciated that the present process adapts both the amount of air flow introduced in the engine cylinder(s) and the amount of post fuel in order to maintain a target temperature adapted for desulfation as well as a predetermined rich exhaust air/fuel mixture in order to operate a rapid desulphurization, without toggling.

For this purpose, the present process determines an amount of post fuel on the basis of:
- the measured air flow (generally measured by mass sensor 16);
- the fuel amount corresponding to the requested torque; and
- the pre-determined rich AFR (lambda <1) in the exhaust.

Concurrently, the amount of fuel required to raise or maintain the temperature of the LNT is determined, and a target air flow is calculated that corresponds to the air flow required for a stoechiometric burning of the LNT-heating dedicated fuel amount and the torque contributing fuel.

Figure 3:
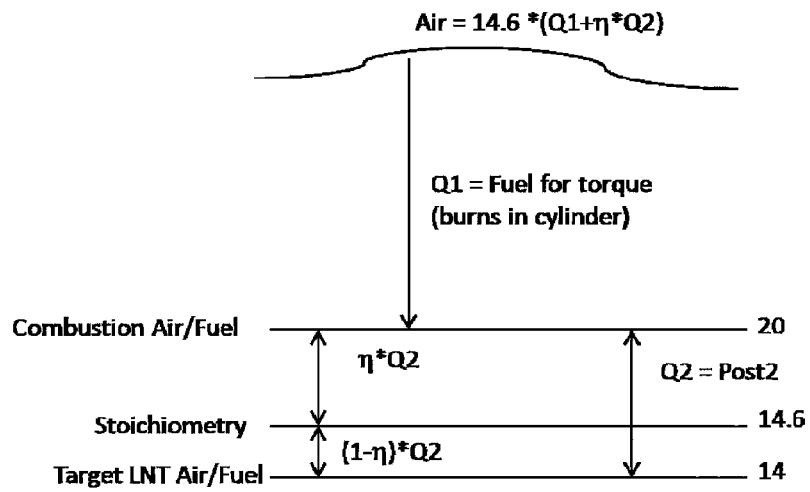
FIG. 3: is a sketch representing the different fuel contributions in the present process.

The principle of the present deSOx will be better understood in reference to FIG. 3, which shows the different fuel contributions. For a given fuel injection event in one cylinder, a fuel quantity $Q_1$ is injected to provide the requested torque, as determined by the ECU in accordance with various conventional rules.

Under certain operating conditions, it is known to add fuel in the exhaust, either through in-cylinder injection (late, unburnt injection) or by injection in the exhaust piping. The injection of fuel in the exhaust is herein referred to as "post injection", regardless of the injection mode, although in-cylinder post injection is preferred. The so-injected fuel is hence referred to as "post fuel".

In order to perform the desulfation of the LNT 20, post fuel is required for heating purposes and for lowering the air/fuel ratio (also noted herein AFR) to the required level for desulfation purposes. In FIG. 3, $Q_2$ is the post fuel amount. The fraction of $Q_2$ that contributes to the heating of the LNT by virtue of an exothermal reaction with the oxidation catalytic material is noted $\eta Q_2$ (catalyst burnt fraction of $Q_2$).

Conversely $(1-\eta)Q_2$ represents the unburnt fraction of the post fuel injection $Q_2$ that is not burnt in the LNT due to a controlled lack of air, and hence serves only for achieving the desired air/fuel ratio in the LNT.

The present deSOx process controls the air flow to the cylinders so that air is available for combusting the torque contributing fuel $Q_1$ and the LNT-heating contributing post fuel $\eta Q_2$.

As it will be understood, the minimum amount of air necessary to burn $Q_1$ and $\eta Q_2$ is:

$$Air=(Q_1+\eta \cdot Q_2)AFR_{stoec}$$

where $AFR_{stoec}$ is the stoichiometric air-fuel ratio, i.e. about 14.6 for diesel engines.

The combustion air-fuel ratio is thus simply:

$$AFR_{combust} = \frac{Air}{Q_1}$$

And finally, the total post fuel quantity is:

$$Q_2 = \frac{Air}{AFR_{rich}} - Q_1$$

where $AFR_{rich}$ is a rich air/fuel ratio, preferably about 14.

Figure 4:
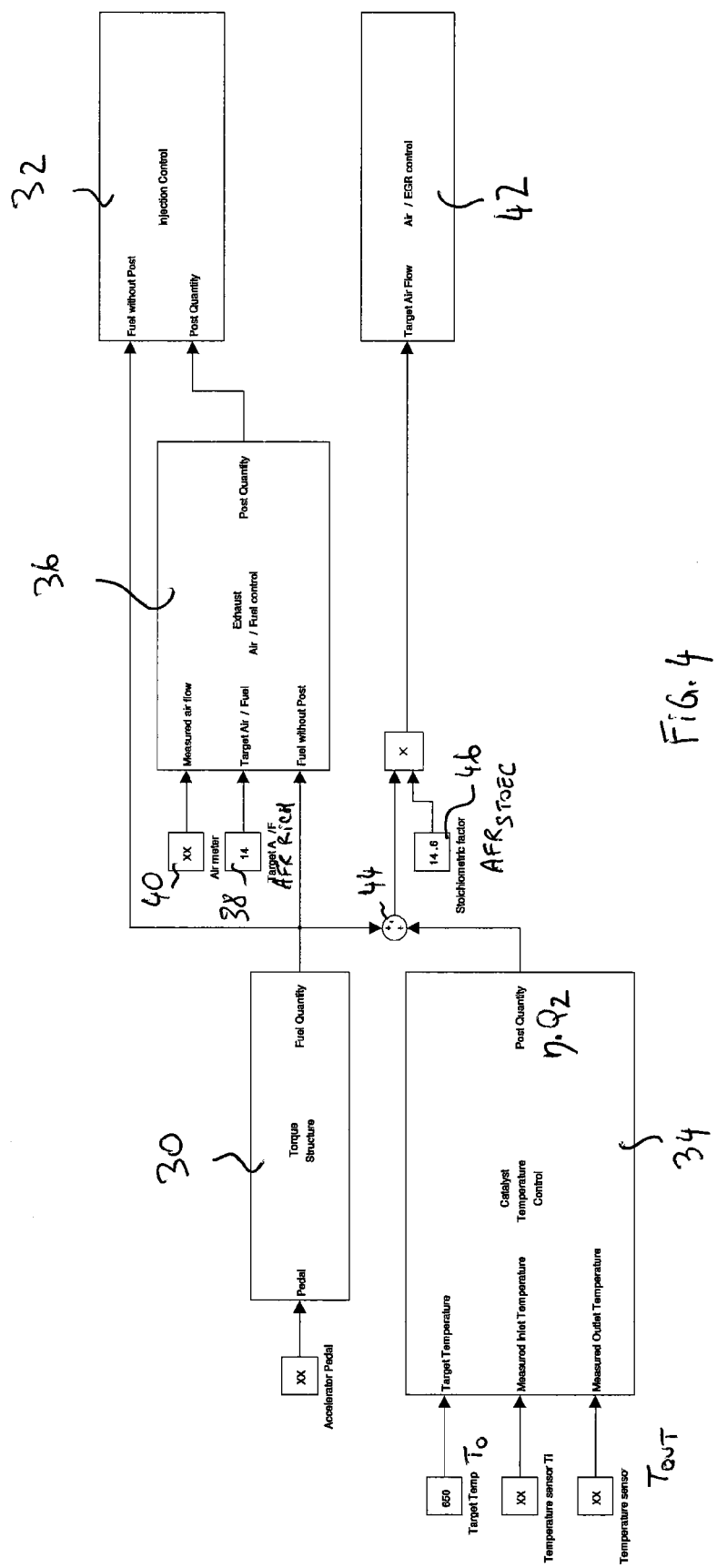
FIG. 4: is a block diagram illustrating the determination of the post fuel quantity and air flow control in accordance with the present process.

FIG. 4 is a block diagram of the components of a system for implementing the present deSOx process. Block 30 is a torque structure module that determines a value representative of the torque-contributing fuel amount $Q_1$. This can be done by any appropriate process, as is known in the art, and is generally function of the position of the accelerator pedal.

Block 32 represents an injection controller that controls the fuel injectors to perform the injection of the fuel quantity $Q_1$ and of the post fuel quantity $Q_2$. Such controllers are known in the art and need not be further detailed herein. As it is also clear for those skilled in the art, the main fuel quantity may be injected in one or more pulses. Similarly, the post injection $Q_2$ can be injected in the cylinder in one or more pulses. Alternatively, the post injection $Q_2$ can be injected directly in the exhaust piping, in-between the engine block 10 and the LNT 20.

Block 34 is the catalyst temperature controller. It is configured to calculate the amount of post fuel required to heat and/or maintain the LNT in the temperature range appropriate for the desulfation, generally between 600 and 750° C. This fuel amount is burnt by the oxidation catalytic function of the LNT and the temperature is raised by virtue of an exothermal reaction. In accordance with the above nomenclature, this heating-contributing amount of fuel is noted $\eta Q_2$.

Preferably, a value representing a heating-contributing post fuel amount is determined on the basis of a mathematical model representing the thermal behavior of the LNT oxidation function, on the basis of the target catalyst temperature and the measured catalyst temperature. A preferred model for this determination is described in EP 2 031 217 and relies on the following formula:

$$\eta \cdot Q_2 = \frac{\dot{m} \cdot c_p (T_o - T_i)}{H(1 - \eta_{exh\_man})\eta_{OX}}$$

where H is the lower fuel heating value, m the exhaust mass flow rate, $c_p$ the specific heat of exhaust gas; $T_O$ is the desired, target outlet temperature and $T_i$ the inlet temperatures of the LNT (e.g. measured by sensor 24), $\eta_{exh\_man}$ is the exothermal efficiency of the exhaust manifold (i.e. fuel fraction burnt between exhaust valves and LNT); and $\eta_{OX}$ is the exothermal efficiency of the LNT associated oxidation function for unburned fuel.

One may notice however that the $\eta Q_2$ value that is output from the catalyst temperature controller 24 is preferably further corrected with a closed-loop controller on the basis of the measured exhaust temperature $T_{OUT}$ at the LNT outlet, as may be measured by sensor 27.

Now, in accordance with the present process, the quantity of post fuel $Q_2$ is determined in block 36 (exhaust A/F controller) on the basis of the measured airflow and of a target, rich air-fuel ratio to ensure rich exhaust gases. Preferably, $Q_2$ is simply computed as:

$$Q_2 = \frac{Air_{meas}}{AFR_{rich}} - Q_1$$

where $AFR_{rich}$ is the target air fuel ratio in the exhaust, for example 14.0, as indicated in box 38; and $Air_{meas}$ is the measured air mass, box 40.

It may be noticed that $AFR_{rich}$ is, as used herein, the target AFR in the exhaust, and more specifically indicates the desired AFR of the exhaust gases that flow through the NOx adsorbing function of the exhaust system, since it is the AFR desired for desulfation. However, since the NOx adsorbing function is now generally present in such LNT together with the oxidation function, the target $AFR_{rich}$ of interest be considered as the target AFR in the LNT, and is preferably measured at the LNT outlet or downstream thereof.

Concurrently, the air is controlled by air/EGR controller 42 using conventional means, however the desired/target air mass is computed as the air required for burning the main injection $Q_1$ and the heating-contributing post fuel $\eta Q_2$, under stoichiometric conditions. This fuel amount is represented by summation operator 44, which adds $Q_1$ and $\eta Q_2$. Then the target air flow $Air_{tgt}$ is calculated as:

$$Air_{tgt}=AFR_{stoec}(Q_1+\eta Q_2)$$

where in FIG. 3 the stoichiometric air-fuel ratio is fixed at 14.6 (box 46).

Finally, the injection controller 32 conducts the desired injections of fuel $Q_1$ and $Q_2$, at required timings, while the air flow is controlled to reach the target air flow $Air_{tgt}$. It should be noted that the target air flow $Air_{tgt}$ may be controlled by adjusting one or more of a throttle valve position, a boost pressure or a position of an exhaust gas recirculation valve.

$AFR_{rich}$ designates, in the context of the present process, the targeted air fuel ratio in the exhaust upon combustion of the torque-contributing fuel $Q_1$ in the engine cylinder and of the heating-contributing fuel $\eta Q_2$ by the oxidation function. As mentioned above, in practice the exhaust air-fuel ratio can be measured downstream of the LNT 20, e.g. by means of sensor 26.

It will be noticed that the fuel amount calculated by controller 34 is used for determining the target air flow $Air_{tgt}$, which is actually admitted in the engine.

Figure 5:
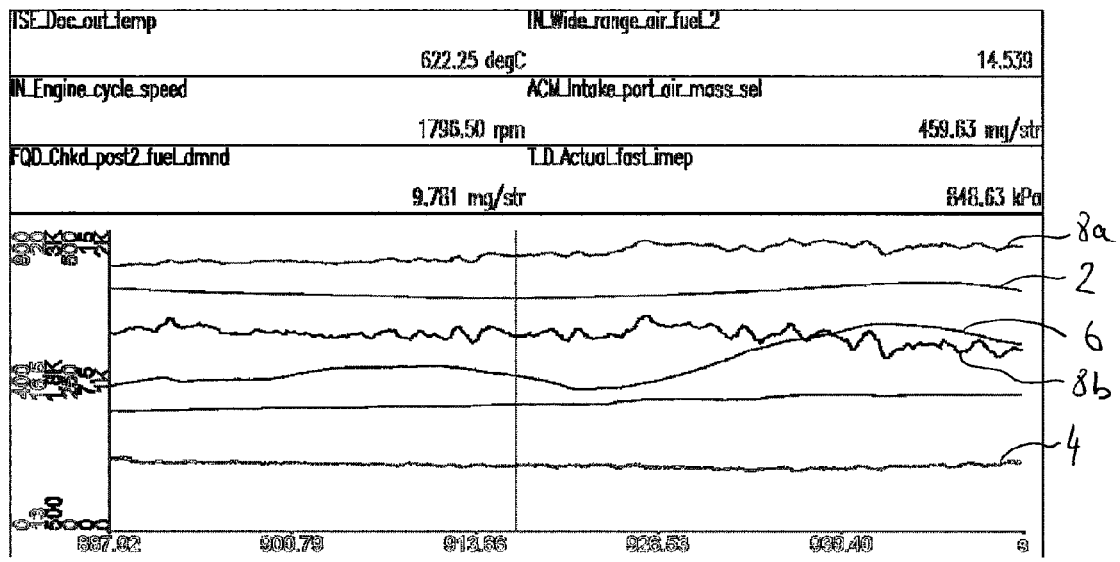
FIG. 5: is a graph showing the stability of the exhaust air fuel ratio and LNT temperature during implementation of the present desulfation process.

It is the exhaust A/F controller 36 that determines $Q_2$ on the basis of the desired $AFR_{rich}$ and measured air flow $Air_{meas}$. The effect of the present process can be observed in FIG. 5, which is a graph plotted from vehicle data recorded under implementation of the present process. The graph shows how the LNT temperature (line 2) and LNT air-fuel ratio (line 4) are maintained on target over about 50 s (in this example) during which the present process is applied, despite engine speed (line 6) variations. The fresh air mass flow (line 8a) and post fuel quantity (line 8b) are continuously adjusted to stick to the target values.

In one embodiment, a closed loop regulation of the post fuel quantity can be performed, as evoked above, by means of an oxygen sensor 25 located downstream of the LNT 20 that allows measuring the air-fuel ratio in the LNT/exhaust. The post fuel $Q_2$ can thus be adapted in case it is detected that the exhaust air-fuel ratio, as measured by sensor 25, does not meet the target $AFR_{rich}$.

It may be noticed that the above description of air flow and post fuel control (in particular as shown in FIG. 3) to maintain a target NOx adsorber desulfation temperature as well as a predetermined rich exhaust air/fuel mixture to operate a rapid desulphurization belongs to the "active phase" of the present process.

The present process preferably includes a heat-up phase prior to the active phase, during which the engine is controlled to heat-up the NOx adsorber up to a threshold value (e.g. lower value of desulfation range). During the heat-up phase the engine may be operated lean, since operation in rich mode is not interesting due to the absence of desulfuration below 550-600° C.

For its practical implementation, the present process advantageously operates with enabling and disabling conditions.

An enabling condition for the deSOx process as a whole is that a desulfation is required. An enabling condition for the present deSOx process may e.g. be given by a sulfur estimator exceeding a threshold value. Such sulfur estimators are known in the art and may e.g. be designed as an integrator based on the fuel and oil consumption.

Conversely, a desulfation counter may be configured to estimate the released amount of sulfur from the NOx trap when operating in the active phase. The deSOx process may then be disabled when the desulfation counter compensates the sulfur estimator, or when a certain level has been reached.

Preferably, the active phase is only enabled when the engine speed and load lie in predetermined ranges, e.g. 1200-2500 RPM and 20 to 50% of maximum load.

Accordingly, the active phase is preferably disabled when at least one of the following event occurs:
the LNT temperature falls out of a predetermined desulfation temperature range;
the engines speed or load exit the predetermined ranges;
the LNT desulfation is complete or an acceptable level of sulfur has been reached.

The invention claimed is:

1. A process for desulfation of a NOx adsorber in an internal combustion engine exhaust system, said process comprising an active phase including:
determining an amount of post fuel ($Q_2$) required to reach a rich target exhaust air fuel ratio ($AFR_{rich}$) on the basis of a measured air flow;
determining a heating-contributing fuel value ($\eta Q_2$) required to reach or maintain a target desulfation temperature in said NOx adsorber by way of an exothermal reaction;
calculating a target air flow ($Air_{tgt}$) corresponding to an air flow required for a stoichiometric combustion of a torque-contributing main fuel quantity ($Q_1$) together with said heating-contributing fuel value ($\eta Q_2$);
causing the engine to inject said post fuel amount ($Q_2$) and said main fuel quantity ($Q_1$) while controlling the air flow to meet said target air flow ($Air_{tgt}$).

2. The process according to claim 1, wherein said NOx adsorber has an associated oxidation catalyst function.

3. The process according to claim 2, wherein said heating-contributing fuel value ($\eta Q_2$) is determined with respect to the exothermal reaction occurring in said associated oxidation catalyst function.

4. The process according to claim 2, wherein said heating-contributing fuel value is determined based on a steady state model of said NOx adsorber with associated oxidation catalytic function.

5. The process according to claim 2, wherein the NOx adsorber and the associated oxidation catalyst function are combined in a single housing.

6. The process according to claim 1, wherein said target air flow is controlled by adjusting one or more of a throttle valve position, a boost pressure or a position of an exhaust gas recirculation valve.

7. The process according to claim 1, wherein said process further comprises enabling said process when an estimator of the sulfur mass trapped in the NOx adsorber exceeds a predefined threshold or when the observed NOx efficiency is too low.

8. The process according to claim 1, wherein said active phase is operated in a predetermined engine speed range and a predetermined load range.

9. The process according to claim 8, wherein said predetermined engine speed range is 1,200 to 2,500 rpm.

10. The process according to claim 8, wherein said predetermined load range is 20% to 50% of maximum engine torque.

11. The process according to claim 1, wherein an exhaust air-fuel ratio is monitored in closed loop by means of an oxygen sensor located downstream of the NOx adsorber and the post fuel amount is adapted when the monitored air-fuel ratio deviates from the rich target exhaust air fuel ratio ($AFR_{rich}$).

12. The process according to claim 1, wherein said process further comprises a heat-up phase, prior to said active phase, wherein the post fuel amount is controlled to bring the NOx adsorber to a predetermined desulfation temperature range.

13. The process according to claim 1, wherein said active phase is disabled in case the temperature of the NOx adsorber exits a desulfation temperature range and/or the engine load and/or speed exit(s) predetermined ranges.

14. The process according to claim 1, wherein said process further comprises disabling said process is based on the status of a desulfation indicator.

\* \* \* \* \*